United States Patent
Kondo et al.

(10) Patent No.: US 6,713,890 B2
(45) Date of Patent: Mar. 30, 2004

(54) POWER GENERATION APPARATUS AND ITS CONTROL METHOD

(75) Inventors: Hiroshi Kondo, Nara (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 10/155,084

(22) Filed: May 28, 2002

(65) Prior Publication Data

US 2002/0186020 A1 Dec. 12, 2002

(30) Foreign Application Priority Data

May 29, 2001 (JP) ...................................... 2001-160920

(51) Int. Cl.⁷ ............................................... H02P 3/00
(52) U.S. Cl. ......................... 290/40 B; 322/12; 307/85
(58) Field of Search ............................... 322/11, 12, 37; 290/40 B, 40 F; 307/85, 64, 31

(56) References Cited

U.S. PATENT DOCUMENTS

| | | | | |
|---|---|---|---|---|
| 4,507,720 A | * | 3/1985 | Colbrese | 363/13 |
| 5,302,857 A | * | 4/1994 | Charles et al. | 307/20 |
| 6,018,200 A | * | 1/2000 | Anderson et al. | 290/40 B |
| 6,046,513 A | * | 4/2000 | Jouper et al. | 307/31 |
| 6,093,885 A | | 7/2000 | Takehara et al. | 136/244 |
| 6,107,560 A | | 8/2000 | Takehara et al. | 136/248 |
| 6,166,525 A | * | 12/2000 | Crook | 322/11 |
| 6,169,678 B1 | | 1/2001 | Kondo et al. | 363/71 |
| 6,252,310 B1 | * | 6/2001 | Wilhelm | 307/11 |
| 6,259,017 B1 | | 7/2001 | Takehara et al. | 136/293 |
| 6,593,670 B2 | * | 7/2003 | Anderson | 307/64 |
| 6,605,881 B2 | * | 8/2003 | Takehara et al. | 307/86 |

FOREIGN PATENT DOCUMENTS

| | | |
|---|---|---|
| JP | 9-17490 | 1/1997 |
| JP | 9-69647 | 3/1997 |
| JP | 10-14111 | 1/1998 |
| JP | 10-309250 | 11/1998 |
| JP | 11-251614 | 9/1999 |

OTHER PUBLICATIONS

"Solar Power Generation System Application Technology Development" 1996 Consigned Operation Result Report of New Energy and Industrial Technology Development Organization (NEDO), Mar. 1997.

"Solar Power Generation System Application Technology Development" 1997 Consigned Operation Result Report of New Energy and Industrial Technology Development Organization (NEDO), Mar. 1998.

* cited by examiner

Primary Examiner—Nicholas Ponomarenko
(74) Attorney, Agent, or Firm—Fitzpatrick, Cella, Harper & Scinto

(57) ABSTRACT

In an AC module, if an interconnection relay is provided in an inverter, the inverter increases in size, and disconnection status between the AC module and a system upon occurrence of abnormal condition cannot be easily checked by a user. Accordingly, a plug is connected to an outlet, thereby an output of the inverter is supplied to the system or a load via a coupler. If leakage of direct current, ground fault of a solar cell or the like, a fault or abnormal condition of the inverter, or an abnormal condition of the system is detected, the inverter outputs a signal to separate the plug from the coupler.

9 Claims, 11 Drawing Sheets

POWER GENERATION APPARATUS AND ITS CONTROL METHOD

FIELD OF THE INVENTION

The present invention relates to a power generation apparatus and its control method, and more particularly, to a power generation apparatus, having a solar cell and a power transducer such as an inverter, to supply alternating power to a commercial power system and a load, and a control method for the apparatus.

BACKGROUND OF THE INVENTION

As the variety of power supply forms increases, a private power generation apparatuses such as a solar cell, a wind power generator, a fuel buttery and an engine power generator attract public attention. Especially, the low-pollution solar cell is popular as a convenient power generation apparatus.

In recent years, a system interconnection type solar photovoltaic system which converts power generated by the solar cell to alternating power by an inverter and supplies the power to a commercial power system (hereinbelow, referred to as a "system") and an independent type solar photovoltaic system which supplies alternating power to a load are widely used. Especially, a solar cell module with inverter (hereinbelow referred to as an "AC module") disclosed in Japanese Published Unexamined Patent Application No. Hei 10-14111 receives attention as a middle and small size solar photovoltaic apparatus or an emergency power source. The AC module is a solar cell module where a small inverter called a Module Integrated Converter (MIC) is attached to a rear surface or the like of solar cell module, and is capable of outputting alternating power by single module.

The AC module as described above is connected to a distribution panelboard by a crimp contact or the like at the end of its lead. If a fault occurs in the AC module, or if an abnormal condition occurs in the system, an interconnection relay in the AC module is opened, thereby the AC module is disconnected from the system.

Further, as shown in FIG. 1, a construction to supply power generated by a solar cell via an outlet to a load or the like has been proposed. In use of an AC module 105 as shown in FIG. 1, a user merely inserts a plug 106 provided at the end of lead of the AC module 105 into an outlet 107, to supply power to a load 109 or the like.

In the solar photovoltaic system in FIG. 1, an inverter 101 of the AC module 105 has an interconnection relay 102. If an abnormal condition occurs in a solar cell 103, the inverter 101 or a system 104, the interconnection relay 102 is opened, thereby the system 104 (and the load 109) is disconnected from the AC module 105.

However, the solar photovoltaic system as shown in FIG. 1 has the following problems.

(1) The interconnection relay 102 in the inverter of the AC module 105 increases the size of the inverter.
(2) As the disconnection between the AC module and the system 104 upon occurrence of abnormal condition is made in the AC module 105, the user cannot easily check the disconnection status.
(3) It is preferable that the user who checked a fault in the AC module 105 operates a branch switch 111 or the like in the distribution panelboard 108 to disconnect the system 104 from the AC module 105, however, this is very troublesome work.
(4) It is preferable that upon occurrence of abnormal condition or fault, the user pulls the plug 106 of the AC module 105 out of the outlet 107, however, the plug 106 might remain plugged.

SUMMARY OF THE INVENTION

The present invention has an object to solve the above-described problems individually or at once, and to attain downsizing of the inverter in the AC module.

Further, another object of the present invention is to facilitate checking of disconnection between the AC module and the system upon occurrence of abnormal condition.

Further, another object of the present invention is to disconnect the system from the AC module upon occurrence of a fault in the AC module.

Further, another object of the present invention is to pull the plug of the AC module from an outlet upon occurrence of abnormal condition or fault.

To attain the above objects, the present invention provides a power generator comprising: a power converter which converts direct current power into alternating current power; a connector which connects an output of said power converter to a commercial power system or a load; and a signal outputting section which supplies a signal to release connection to said connector.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that the present invention is applicable to a wind power generator, a fuel buttery, an engine power generator, a power generation apparatus using a battery, and the like, as well as the solar photovoltaic apparatus.

First Embodiment

[AC Module]

Figure 1:
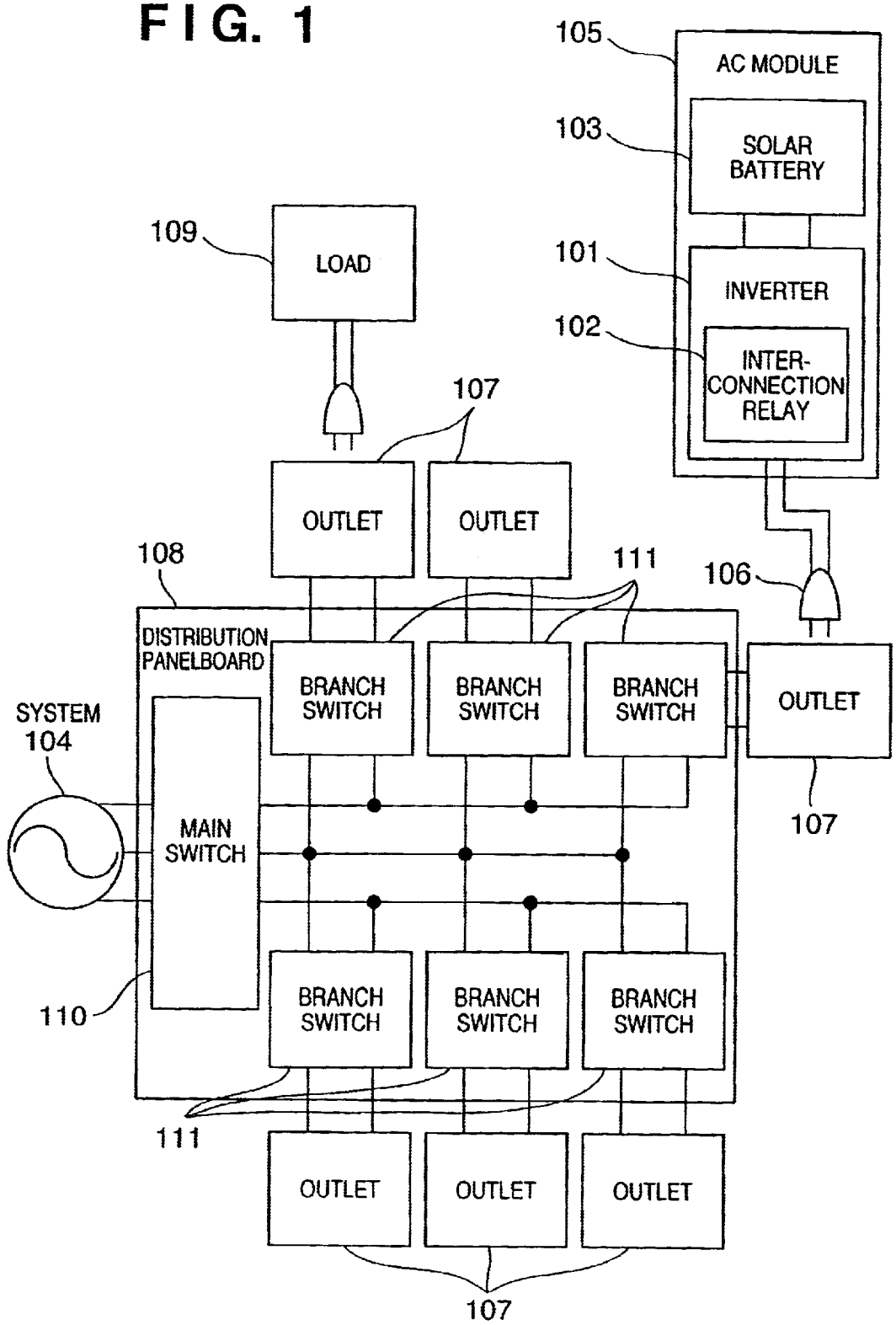
FIG. 1 is a block diagram showing the construction of a solar photovoltaic system using an AC module.
Figure 2:
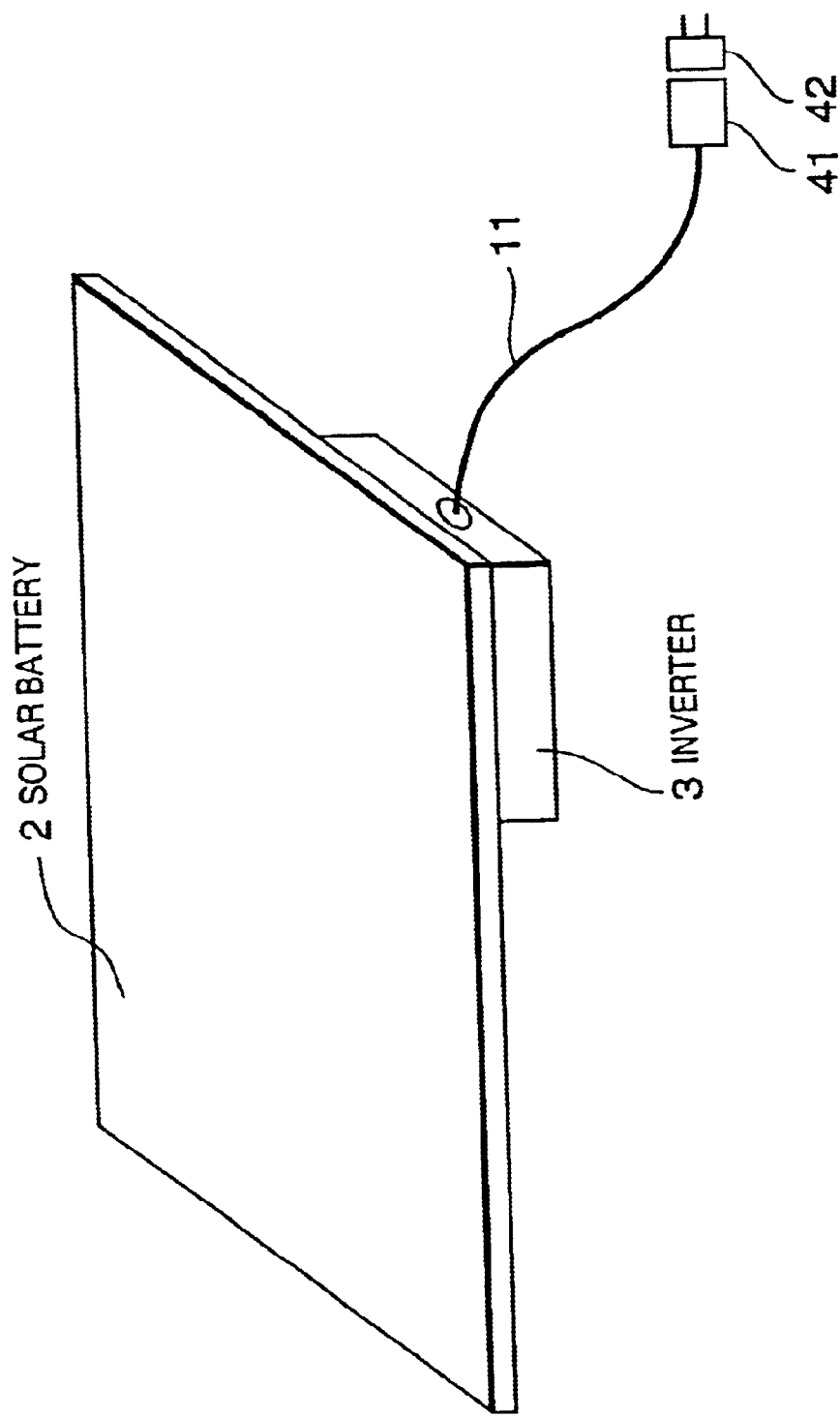
FIG. 2 is a perspective view showing an outer appearance of the AC module.

FIG. 2 is a perspective view showing an outer appearance of the AC module according to the present embodiment. Main constituent elements of the AC module are as follows.

As a solar cell 2 occupying a major portion of the AC module, a solar cell having a photovoltaic transducer of amorphous silicone, polycrystalline silicone or crystalline silicone, is preferably used. Further, the solar cell 2 is provided with an electrode (not shown) for outputting alternating power. Note that the solar cell used in the present invention has a rated output voltage of 25V. An inverter 3 is attached to a non-photoreception surface of the solar cell 2.

Output power from the inverter 3 and an exciting current to excite an electromagnet to be described later are sent to a coupler 41 via an inverter-coupler cable 11. Accordingly, the inverter-coupler cable 11 must have 2 lines to supply the output power from the inverter 3 and 2 lines to supply the exciting current.

In the present embodiment, for connection between the inverter 3 and a system, the coupler 41 and a plug 42 (connector) to be described in detail later are provided.

[Inverter]

Figure 3:
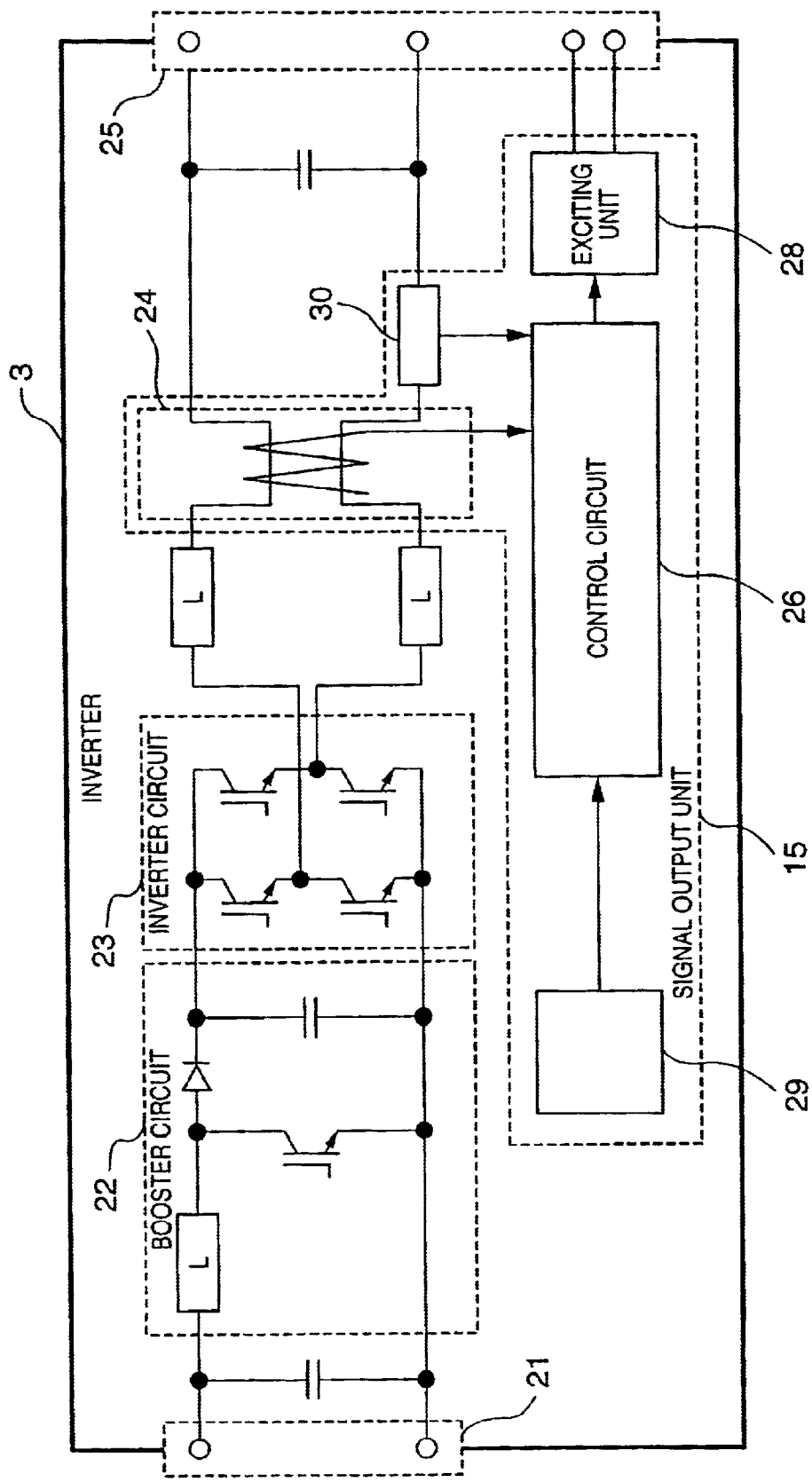
FIG. 3 is a block diagram showing the construction of an inverter.

FIG. 3 is a block diagram showing the construction of the inverter 3.

The inverter 3 comprises an input unit 21, an input/output noise filter, a booster circuit 22, an inverter circuit 23, a control circuit 26, an output unit 25, a zero phase current detector 24, an alternating current detector 30, an exciting unit 28 to excite the electromagnet and the like. The inverter 3 converts power generated by the solar cell 2 inputted into the input unit 21 to e.g. a direct current of 25V to 160V by the booster circuit 22. The inverter circuit 23, having bridge-connected plural switching elements, converts the direct current 160V to e.g. an alternating current of 100V by pulsewidth modulation (PWM) control by the control circuit 26. Note that the input voltage of the inverter circuit 23 is 160V for allowance of transmission of alternating power even with voltage variation of 10% of the system alternating voltage (100V).

The control circuit 26 comprising a microprocessor and the like generates a PWM switching control signal to be supplied to the inverter circuit 23 as follows.

The control circuit 26 compares the voltage inputted into the inverter circuit 23 with a voltage command value Vref and generates an input error signal. On the other hand, the control circuit uses a band-pass filter to extract a fundamental frequency component of the voltage at the interconnection point from the alternating voltage of the output unit 25. Then the control circuit generates a current command value signal indicating a control target value by multiplication between the input error signal and the extracted fundamental frequency component. The control circuit generates a current error signal by calculation between the current command value signal and the output alternating current. A gate drive circuit as a part of the control circuit 26 compares the current error signal with a reference triangular wave signal of about several 10 kHz, generates the PWM switching control signal, and supplies the signal to the respective switching elements in the inverter circuit 23.

Note that in a status where the solar cell 2 does not generate power at night time or the like, or in a case where an abnormal condition occurs in the inverter 3 or the solar cell 2, the control circuit 26 does not supply the PWM switching control signal to the inverter circuit 23, and the inverter circuit 23 enters a gate block status.

By the above-described feedback control, the inverter 3 outputs alternating power having a power factor of approximately 1 and approximately the same current phase as that of the system. Note that many other PWM control methods than the above PWM control method are known and can be utilized.

Further, power consumed by the control circuit 26 and the various detectors may be supplied from the solar cell 2, or supplied from the alternating output side, i.e., the system.

The inverter 3 is provided with the zero phase current detector 24 to detect a ground-fault current, the direct current detector 30, an internal temperature detector 29 and the like. Detection values from these detectors are sent to the control circuit 26. The control circuit 26 holds predetermined values of zero phase current, direct current, internal temperature and the like. If one of the detection values exceeds the predetermined value, the control circuit 26 sends an abnormality detection signal to the exciting unit 28. The exciting unit 28 receives the abnormality detection signal, and outputs a current to excite the electromagnet to be described later via the output unit 25.

In the inverter 3, the detectors including the zero phase current detector 24, the direct current detector 30 and the internal temperature detector 29, the control circuit 26 and the exciting unit 28, construct a signal output unit 15 to instruct mechanical disconnection between the plug and the outlet to be described later.

The zero phase current detector 24 detects a ground-fault current which is caused when ground fault occurs in the inverter 3 or the solar cell 2. When the ground fault occurs, a ground-fault interrupter of customer operates to stop power supply from the system to the customer. To prevent this stoppage of power supply, the ground-fault current is detected in the inverter 3.

If a direct current power flows through the system due to abnormal condition of the inverter 3, it bias-magnetizes a pole-type transformer or the like and ill effects the system. Accordingly, to prevent leakage of the direct current power to the outside the inverter 3, the direct current detector 30 detects the direct current at an alternating output end of the inverter 3. Note that as the direct current detector 30, various devices such as a Hall element sensor and shunt resistor can be used.

The internal temperature detector 29 detects abnormal temperature rise in the inverter 3 which occurs due to current flowing through a broken element such as the switching element.

[Connector]

Figure 4:
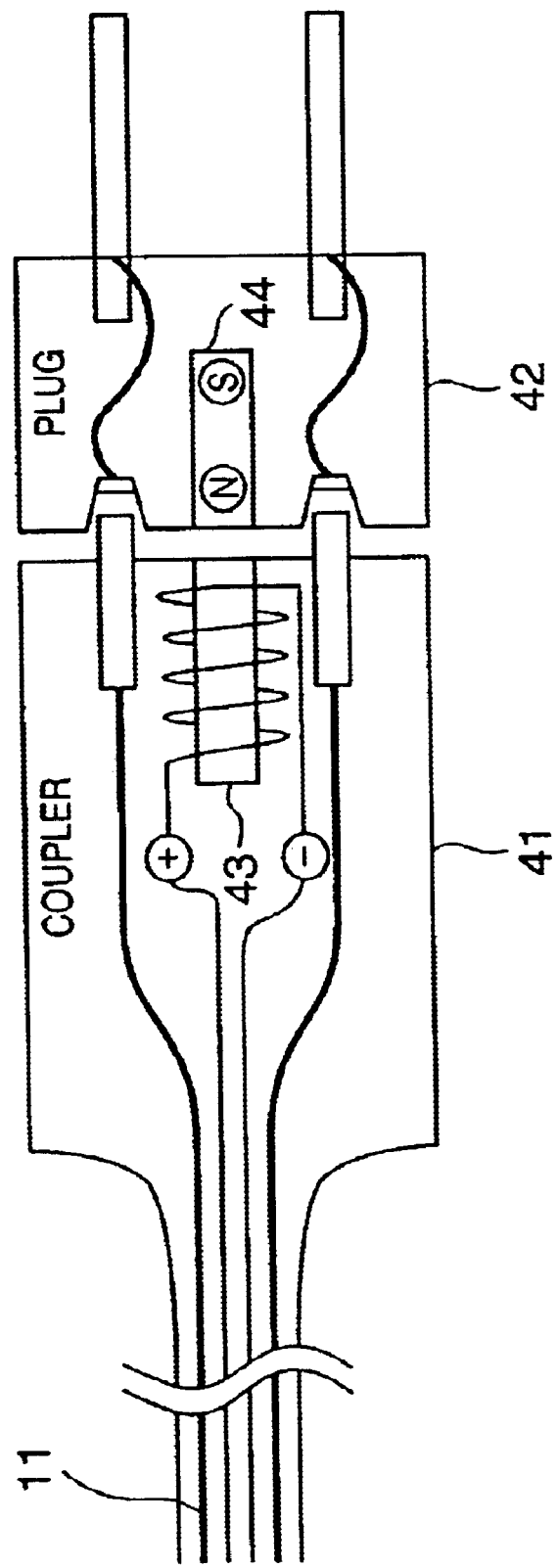
FIG. 4 is a cross-sectional view showing the constructions of coupler and plug constructing a connector.

FIG. 4 is a cross-sectional view showing the constructions of the coupler 41 and the plug 42 constructing a connector.

The coupler 41 includes an electromagnet 43, and the plug 42, a permanent magnet 44. As the permanent magnet 44, a rubber magnet, a ferrite magnet, an alnico magnet or the like can be used. In the present embodiment, an alnico magnet is used as the permanent magnet to obtain a simple shape and high magnetic power. Further, the permanent magnet 44 of the present embodiment is provided such that the coupler 41 side is the N pole.

At normal times, i.e., when the exciting current is not outputted from the exciting unit 28, the coupler 41 and the plug 42 are coupled by the magnetic force of the permanent magnet 44. Accordingly, the power generated by the solar cell 2 is supplied through the inverter 3, the inverter-coupler cable 11, the coupler 41 and the plug 42, to the system, the load and the like.

Upon occurrence of abnormal condition, i.e., when the exciting current is outputted from the exciting unit 28, the plug 42 side of the electromagnet 43 becomes the N pole. Then a magnetic force generated by the electromagnet 43 causes repulsion between the electromagnet and the permanent magnet 44, which separates the coupler 41 from the plug 42.

Note that if the S pole of the permanent magnet 44 is provided on the coupler 41 side and the plug 42 side of the excited electromagnet 43 is the S pole, the same result is attained. Further, it may be arranged such that the electromagnet 43 is excited at normal times to couple the coupler 41 with the plug 42, and the exciting current is cut upon occurrence of abnormal condition to separate the coupler 41 from the plug 42. Note that the construction of the present invention where the coupling is maintained by the magnetic force of the permanent magnet 44 at normal times is more preferable than the construction where the electromagnet is excited at normal times in that the construction of the present embodiment does not consume electric power at normal times.

Further, as shown in FIG. 4, as the contact of the plug 42 is provided in a position withdrawn from the coupling surface with the coupler 41, short circuit and contact can be prevented. Further, although the contact of the coupler 41 is projected from the coupler 41, when the coupler 41 is separated from the plug 42, the inverter 3 is put into a gate-block status to avoid occurrence of voltage at the contact of the coupler 41. Further, it is safer to establish a short-circuit of the output of the solar cell 2 in the inverter 3.

[Connection between AC Module and System]

Figure 5:
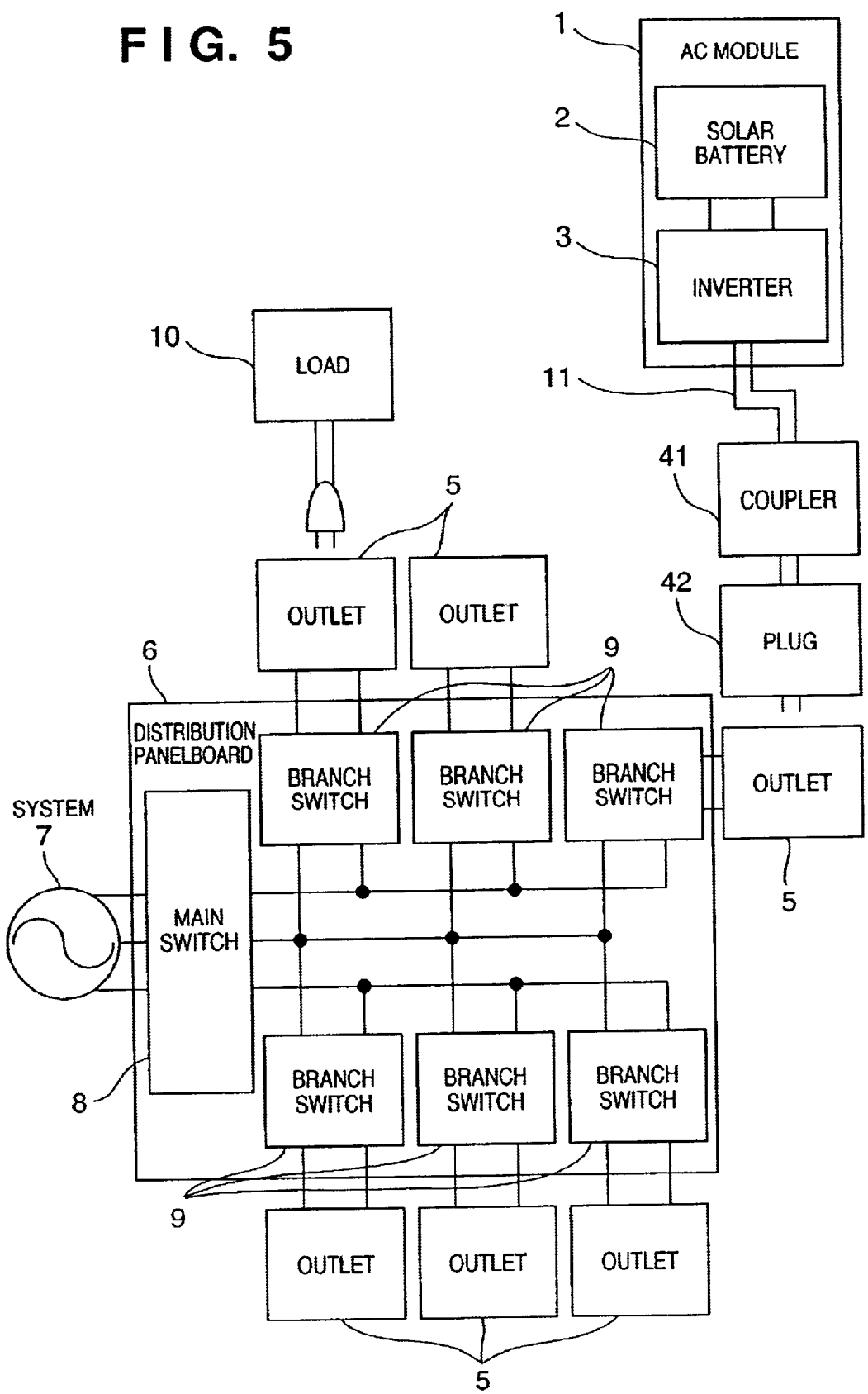
FIG. 5 is a block diagram showing connection between the AC module and a system (and a load)

FIG. 5 is a block diagram showing connection between an AC module 1 and a system 7 (and a load 10).

The plug 42 of the AC module 1 is connected to an outlet 5 to which a load 10 is connected at normal times in a customer. The respective outlets 5 are connected to a distribution panelboard 6. The distribution panelboard 6 is provided with branch switches 9 for connection/disconnection with the outlets 5 or the like, and a main switch 8 for connection/disconnection between the customer and the system 7. Further, a selling/buying electric meter (not shown) is provided between the system 7 and the distribution panelboard 6, for measuring the amount of used power supplied from the system 7 and the amount of power supplied to the system 7.

[Operation of AC Module]

The AC module 1 of the present embodiment operates as follows.

When the solar cell 2 is in a power generation status, the generated power is converted by the inverter 3 to alternating power and supplied via the inverter-coupler cable 11, the coupler 41 and the plug 42 to the outlet 5.

Assuming that the switching element of the inverter 3 is broken and heat is abnormally evolved in the inverter 3, the control circuit 26 compares a detection value from the internal temperature detector 29 with the predetermined value to detect the occurrence of abnormal condition, and sends the abnormality detection signal to the exciting unit 28. The exciting unit 28 receives the abnormality detection signal, outputs the exciting current, to separate the coupler 41 from the plug 42. That is, when an abnormal condition of the AC module 1 is detected, the AC module 1 is automatically separated from the system 7.

Note that the cause of separation of the AC module 1 from the system 7 is not limited to the abnormal temperature rise in the inverter 3. The AC module 1 is automatically separated from the system 7 due to ground fault occurred in the solar cell 2 or the inverter 3 or leakage of direct current from the inverter 3.

Figure 6:
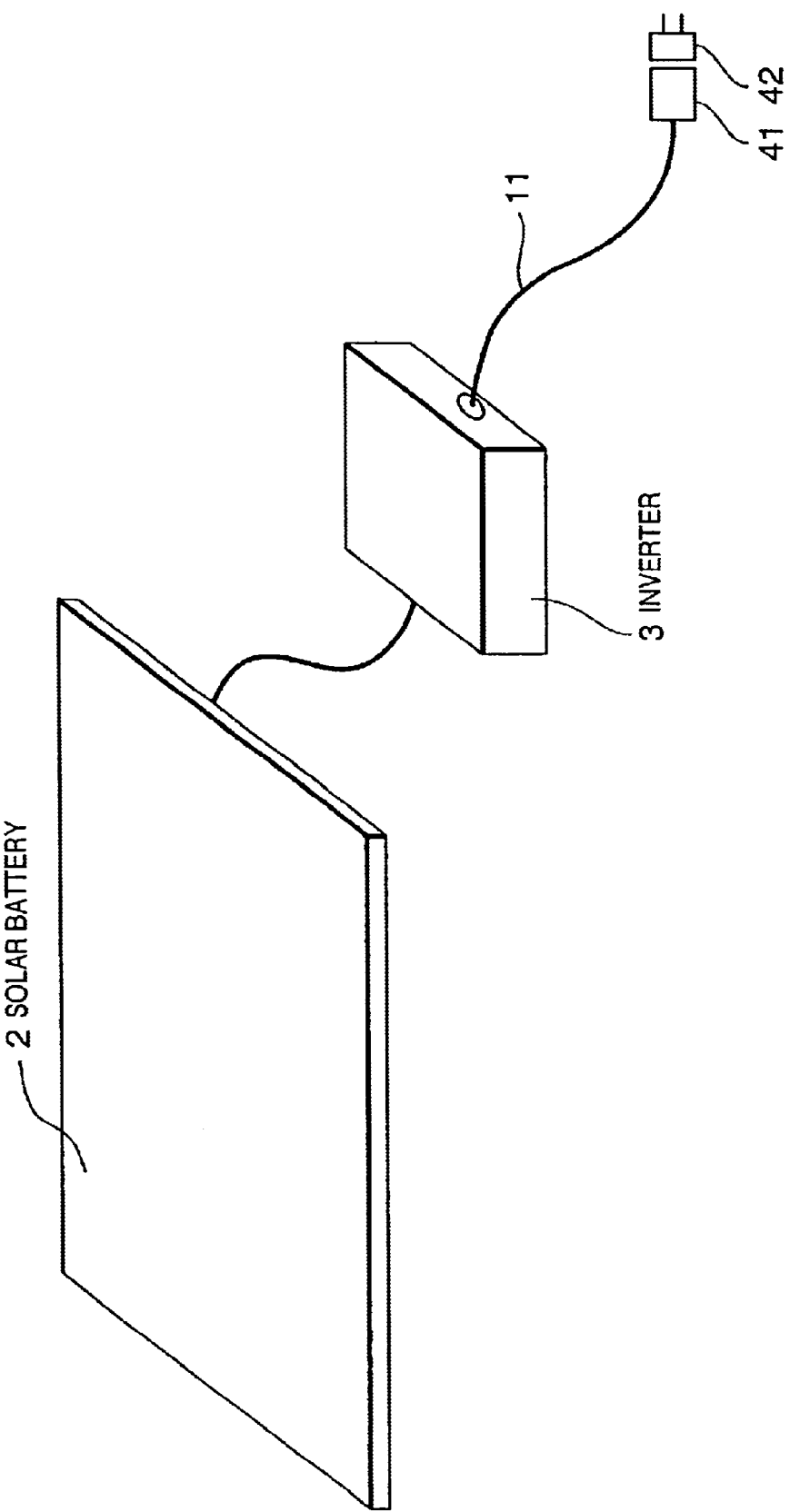
FIGS. 6 and 7 are perspective views showing other constructions of the solar photovoltaic system.
Figure 7:
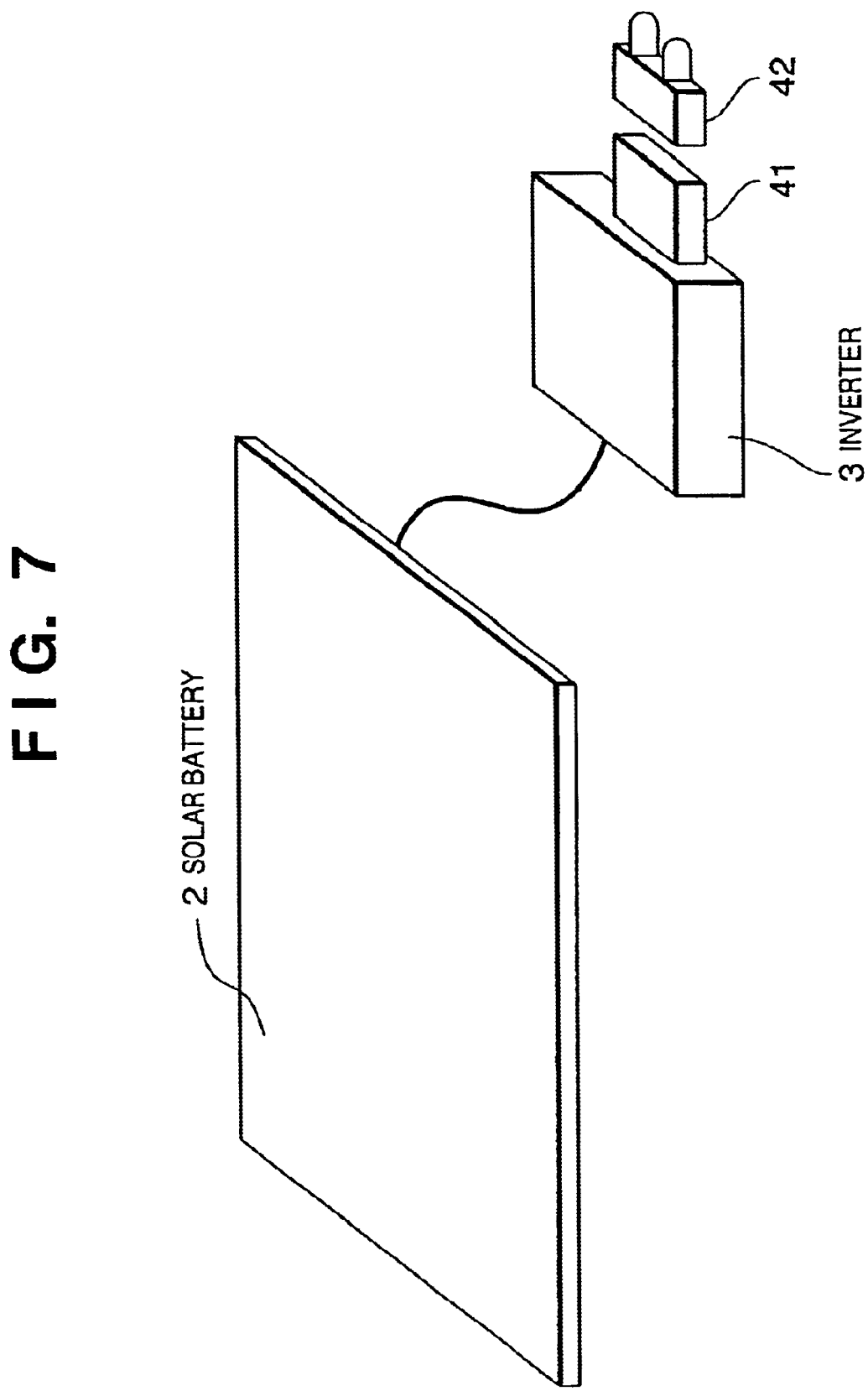

Further, FIG. 2 shows an example where the solar cell 2 and the inverter 3 are integrated with each other, and the inverter 3 and the coupler 41 are connected with each other via a cable, however, the construction as shown in FIG. 6 where the solar cell 2 and the inverter 3 are separately provided and connected with each other via a cable, and the construction as shown in FIG. 7 where the inverter 3 and the coupler 41 are integrated with each other, may be employed.

As described above, according to the present embodiment, the following advantages are obtained.

(1) As it is not necessary to provide an interconnection relay in the AC module, the AC module 1 can be further downsized.

(2) As the disconnection between the AC module and the system 7 upon occurrence of abnormal condition is made between the coupler 41 and the plug 42, the user can easily check the disconnection status.

(3) It is not necessary for the user who checked a fault in the AC module 1 to disconnect the system 7 from the AC module 1.

(4) Upon occurrence of abnormal condition or fault, it is necessary for the user to disconnect the AC module from the outlet 5.

Second Embodiment

Hereinbelow, the solar photovoltaic apparatus according to a second embodiment of the present invention will be described. Note that in the second embodiment, elements corresponding to those of the first embodiment have the same reference numerals, and the detailed explanations of the elements will be omitted.

In the first embodiment, the coupler 41 is separated from the plug 42 by sending the exciting current from the exciting unit 28 of the inverter 3 via the inverter-coupler cable 11 to the coupler 41. As the exciting current, a comparatively large current is required for exciting the electromagnet 43.

Figure 8:
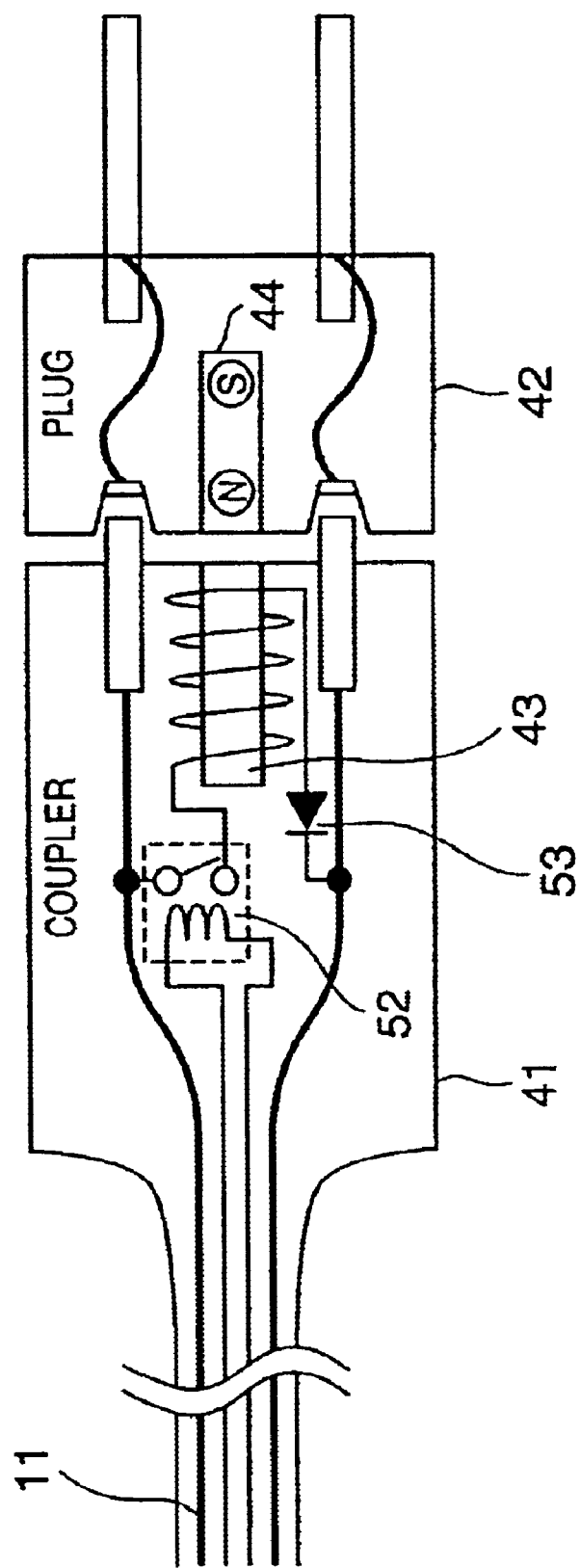
FIG. 8 is a cross-sectional view showing the construction of the connector according to a second embodiment.

FIG. 8 is a cross-sectional view showing the construction of the connector according to the second embodiment. The coil of the electromagnet 43 is connected to an alternating power line via an electromagnetic relay 52 and a diode 53.

In the second embodiment, the electromagnetic relay 52 is provided in the coupler 41, and the electromagnetic relay 52 is driven from the exciting unit 28 of the inverter 3, to excite the electromagnet 43 by utilizing alternating power. When the electromagnet 52 is driven, a half-wave rectified current is supplied via a relay contact and the diode 53 to the electromagnet 43, and the coupler 41 is separated from the plug 42.

In this manner, the separation is made by sending a comparatively small power signal from the inverter 3 via the inverter-coupler cable 11. For example, in the first embodiment, to directly excite the electromagnet 43, the exciting unit 28 must output several hundred mA to several A, whereas the exciting unit 28 of the second embodiment which drives the electromagnetic relay 52 outputs a current of several m to several ten mA.

Further, in the construction where the electromagnet 43 is excited by the power of the alternating power line in the coupler 41, the coupler 41 can be separated from the plug 42 by communication between the inverter 3 and the coupler 41 by utilizing infrared ray, an electromagnetic wave or the like.

Third Embodiment

Hereinbelow, the solar photovoltaic apparatus according to a third embodiment of the present invention will be described. Note that in the third embodiment, elements corresponding to those of the first embodiment have the same reference numerals, and the detailed explanations of the elements will be omitted.

In the third embodiment, timing of separation between the coupler 41 and the plug 42 is set to about zero of the alternating voltage, thereby the contact is protected.

Figure 9:
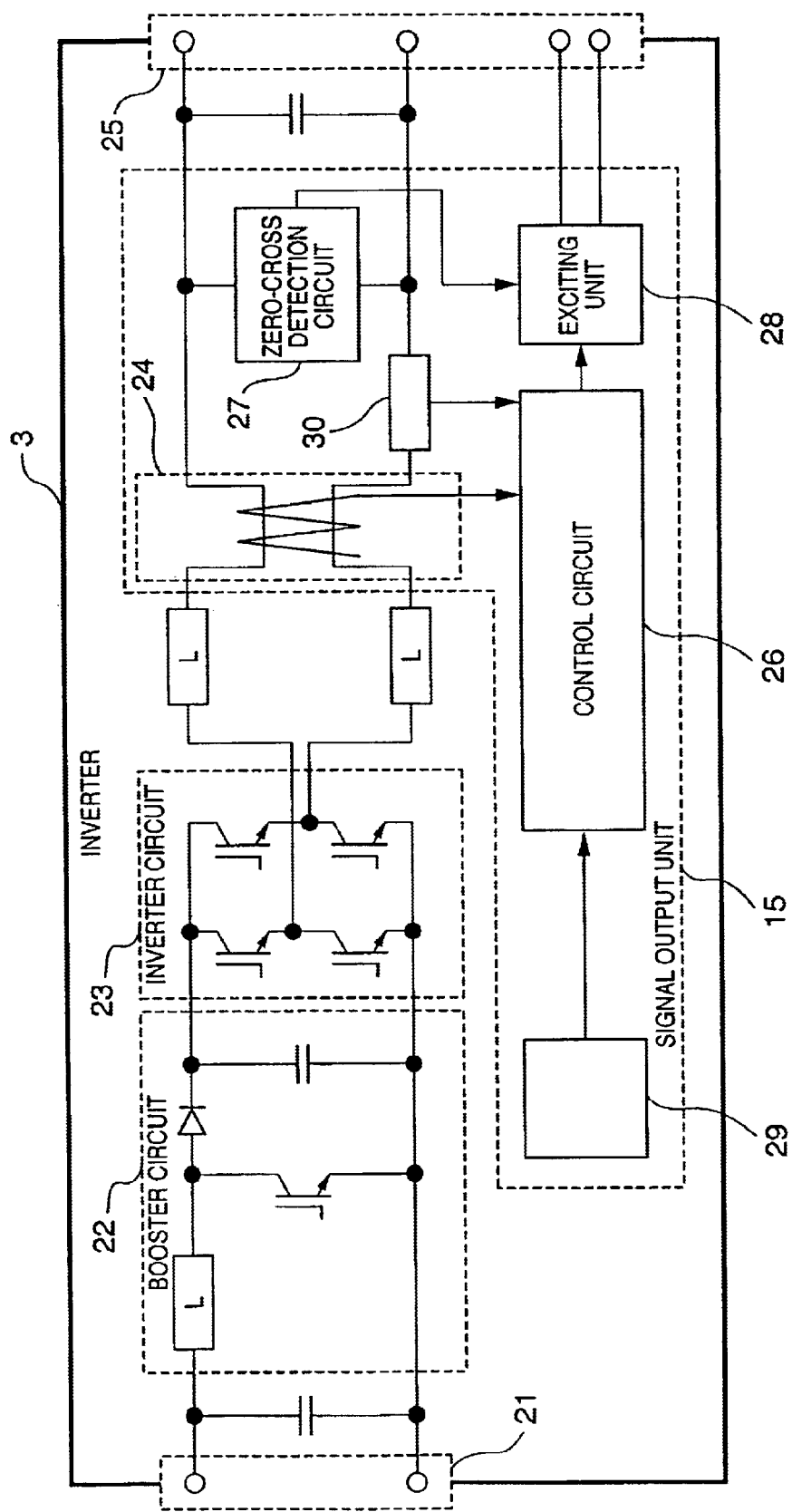
FIG. 9 is a block diagram showing the construction of the inverter according to a third embodiment.

FIG. 9 is a block diagram showing the construction of the inverter 3 according to the third embodiment. A zero-cross detection circuit 27 is provided at an alternating current output terminal of the inverter 3.

Figure 10:
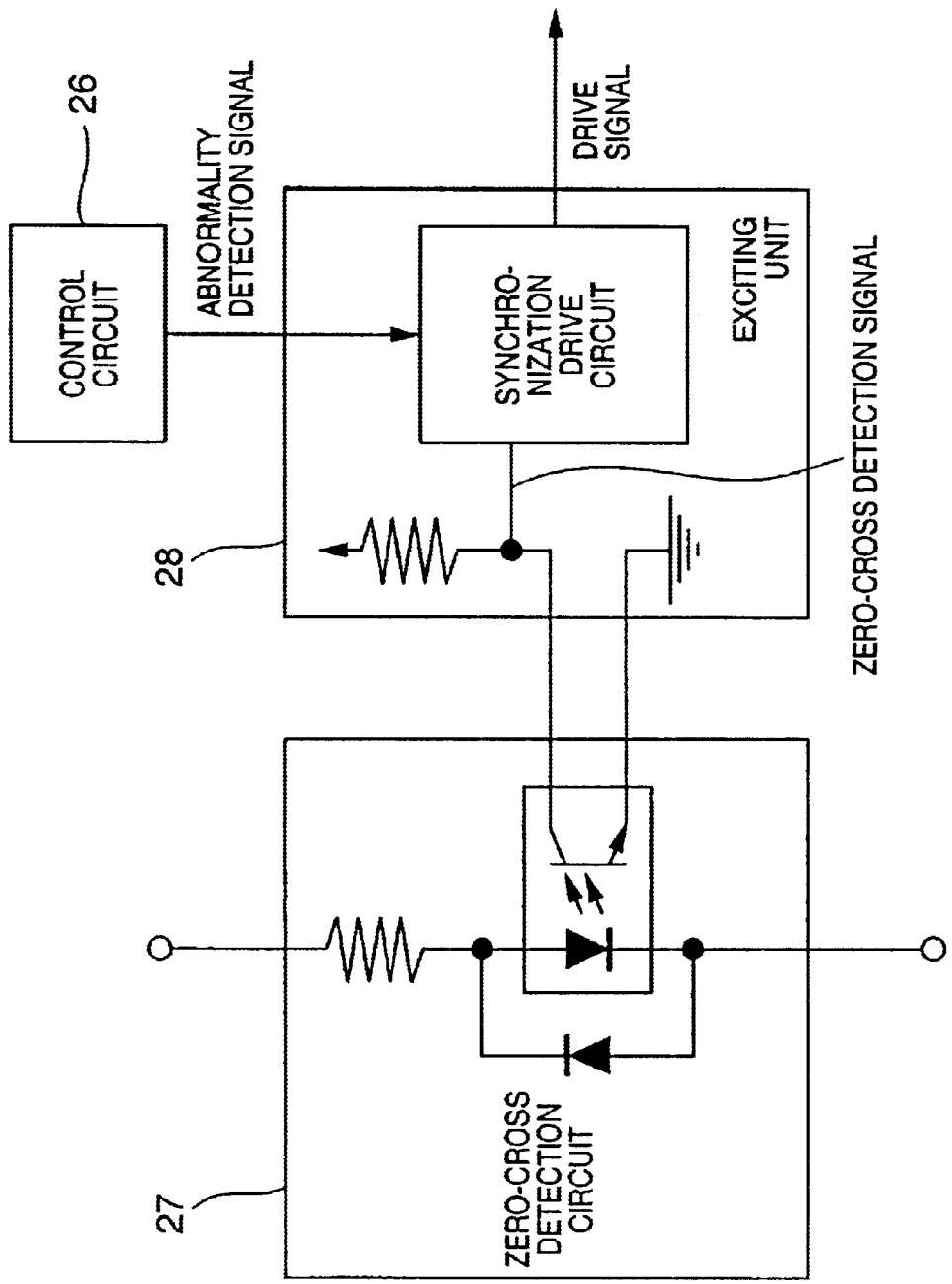
FIG. 10 is a block diagram showing the constructions of zero-cross detection circuit and exciting unit.
Figure 11:
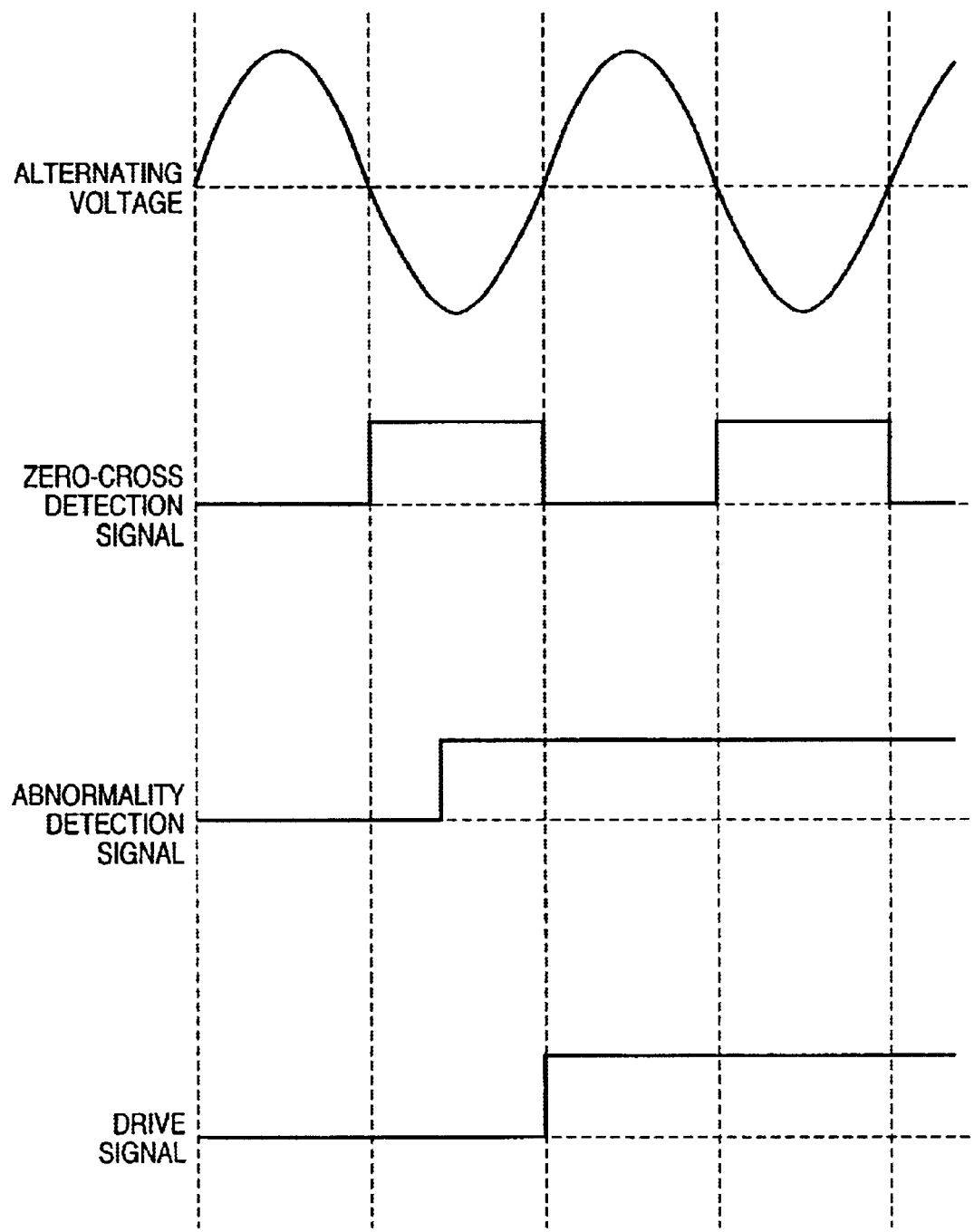
FIG. 11 is a timing chart explaining output timing of drive signal.

FIG. 10 is a block diagram showing the constructions of a zero-cross detection circuit 27 and the exciting unit 28. FIG. 11 is a timing chart explaining output timing of drive signal.

The zero-cross detection circuit 27 comprises a current limit resistor, a photocoupler and a diode to prevent application of inverse voltage to the photocoupler and an input of the photocoupler. The output of the photocoupler is conducting during a period in which a current flows through the input of the photocoupler (e.g. during a period in which the alternating voltage is positive). Accordingly, a zero-cross detection signal having a rectangular wave voltage as shown in FIG. 11 is inputted into a synchronization drive circuit of the exciting unit 28 connected via a pull-up resistor to a control power source.

When the abnormality detection signal is inputted from the control circuit 26, the synchronization drive circuit outputs the drive signal (e.g., an exciting current) in synchronization with a rising edge or falling edge of the zero-cross detection signal.

In this manner, the coupler 41 is separated from the plug 42 at about zero of the alternating voltage, and the contact can be protected.

According to the above-described respective embodiments, the following advantages are obtained.

(1) In a power generation apparatus using a solar cell, a wind power generator, a fuel battery, an engine power generator, a battery or the like connected to a system, safety upon occurrence of abnormal condition can be further improved.

(2) As disconnection between the AC module and the system can be made outside the inverter, the inverter can be easily downsized.

(3) The contact for disconnection between the inverter and the system upon occurrence of abnormal condition is provided outside the device, and the disconnection is mechanically (automatically) made, thereby the disconnection status can be visually checked.

(4) Upon occurrence of abnormal condition in the AC module or the system, as the AC module is physically separated from the system, safety of the power generation apparatus can be maintained.

As many apparently widely different embodiments of the present invention can be made without departing from the spirit and scope thereof, it is to be understood that the invention is not limited to the specific embodiments thereof except as defined in the appended claims.

What is claimed is:

1. A power generator comprising:
   a power converter which converts direct current power into alternating current power;
   a connector which connects an output of said power converter to a commercial power system or a load; and
   a signal outputting section which supplies a signal to release connection to said connector.

2. The power generator according to claim 1, further comprising a detector which detects leakage of said direct current power to said commercial power system, ground fault of a solar cell to supply said direct current power, a fault or abnormal condition of said power converter or an abnormal condition of said commercial power system,
   wherein if said detector has detected an abnormal condition, said signal outputting section outputs said release signal.

3. The power generator according to claim 1, wherein the connector comprises:
   a plug which is plugged in an outlet connected to said commercial power system or load, and has a permanent magnet; and
   a coupler which couples the plug and the output of said power converter, and has an electromagnet excited by said release signal,
   wherein coupling of the plug and the coupler is released by said release signal.

4. The power generator according to claim 3, wherein the coupling is released by repulsion between a magnetic field of said permanent magnet and a magnetic field of said electromagnet.

5. The power generator according to claim 1, wherein the connector comprises:
   a plug which is plugged in an outlet connected to said commercial power system or load, and has a permanent magnet; and
   a coupler which couples the plug and the output of said power converter, and a relay driven by said release signal and an electromagnet supplied with an electric current through the relay,
   wherein coupling of the plug and coupler is released by said release signal.

6. The power generator according to claim 5, wherein the coupling is released by repulsion between a magnetic field of said permanent magnet and a magnetic field of said electromagnet.

7. The power generator according to claim 1, further comprising a sensor which detects a zero voltage of alternating voltage,
   wherein said signal outputting section outputs said release signal in synchronization with detection of the zero voltage by said sensor.

8. The power generator according to claim 1, wherein the generator is integrated with a solar battery which supplies the direct current power to the power converter.

9. A control method of controlling a power generator which has a power converter which converts direct current power into alternating current power and a connector which connects an output of said power converter to a commercial power system or a load, comprising the steps of:
   detecting leakage of said direct current power to said commercial power system, ground fault of a solar cell to supply said direct current power, a fault or abnormal condition of said power converter and an abnormal condition of said commercial power system; and
   if an abnormal condition has been detected, a signal to release connection is supplied to said connector.

* * * * *

UNITED STATES PATENT AND TRADEMARK OFFICE
CERTIFICATE OF CORRECTION

PATENT NO. : 6,713,890 B2
DATED : March 30, 2004
INVENTOR(S) : Hiroshi Kondo et al.

It is certified that error appears in the above-identified patent and that said Letters Patent is hereby corrected as shown below:

Column 1,
Line 16, "apparatuses" should read -- apparatus --.
Line 17, "buttery" should read -- battery --.
Line 18, "attract" should read -- attracts --.
Line 64, "operates" should read -- operate --.

Column 2,
Line 2, "pulls" should read -- pull --.
Line 67, "buttery," should read -- battery, --.

Column 6,
Line 55, "several m" should read -- several mA --.

Signed and Sealed this

Fourteenth Day of December, 2004

JON W. DUDAS
*Director of the United States Patent and Trademark Office*